United States Patent
Abelbeck et al.

[19]

[11] Patent Number: 5,961,018

[45] Date of Patent: Oct. 5, 1999

[54] TOTE BAG

[75] Inventors: Kevin G. Abelbeck, Los Angeles, Calif.; Elizabeth Wright; Thomas Wright, both of 434 Eric La., Templeton, Calif. 93465

[73] Assignees: Elizabeth Wright; Thomas Wright, both of Templeton, Calif.

[21] Appl. No.: 09/141,998

[22] Filed: Aug. 28, 1998

Related U.S. Application Data

[63] Continuation-in-part of application No. 08/852,006, May 6, 1997, abandoned.

[51] Int. Cl.$^6$ .................................................. B62B 5/00
[52] U.S. Cl. ......................... 224/584; 224/585; 224/411; 224/484
[58] Field of Search .................... 224/411, 409, 224/401, 584, 585, 484, 270, 42.11

[56] References Cited

U.S. PATENT DOCUMENTS

| | | | |
|---|---|---|---|
| 2,384,285 | 9/1945 | Deutsch | 224/409 X |
| 4,512,504 | 4/1985 | Owlett | 224/411 X |
| 4,871,100 | 10/1989 | Posner | 224/42.46 R |
| 4,874,340 | 10/1989 | Smallwood | 446/28 |
| 4,991,245 | 2/1991 | Franco | 5/419 |
| 5,009,516 | 4/1991 | Geeck | 383/37 |
| 5,031,807 | 7/1991 | Tiffany | 224/585 X |
| 5,048,736 | 9/1991 | Anatra | 224/411 X |
| 5,103,514 | 4/1992 | Leach | 5/417 |
| 5,244,278 | 9/1993 | Robitaille | 383/4 |
| 5,297,872 | 3/1994 | Caligiuri | 383/86 |
| 5,326,300 | 7/1994 | Sonders | 446/74 |
| 5,387,037 | 2/1995 | Daitch | 224/409 X |
| 5,531,366 | 7/1996 | Strom | 224/153 |

OTHER PUBLICATIONS

Shopping cart Friend, The Right Start Catalog, Westlake Village, CA 91361–4627 (no date).

*Primary Examiner*—Renee S. Luebke

[57] ABSTRACT

The disclosed invention is a means of transporting personal items such as those commonly taken to do shopping, and storing them in an easily accessible manner to a shopping cart or stroller handle. The device can also include a second side for children riding in the child's seat of a shopping cart, thereby allowing storage for items of entertainment to the child or even a pillow for their comfort during the shopping excursion. The device is comprised of one or more flaps, at least some of the flaps including pockets that are capable of distinctively storing items that would be necessary to a shopper or child, whichever the case may be. The invention includes a pliable portion that is capable of flexing around and fastening to the handle of a shopping cart or stroller and in doing so creating accessible pockets that are exclusive to each the child and the shopper. Lowered openings of the pockets on the user's flap restricts a small child's access to the shopper's items that are not intended for the child to encounter. Cover flaps can also be used to restrict accessibility to some or all pockets by providing a barrier to the child as well as a potential thief yet still providing easy accessibility to the user. The invention can be removably attached to the handle if the shopper brings their own to the store or permanently secured to the handle as would be the case if the invention is provided as an accessory to the cart.

8 Claims, 4 Drawing Sheets

TOTE BAG

This is a continuation-in-part of Ser. No. 852,006 filed May 6, 1997, abandoned.

BACKGROUND OF THE INVENTION

1. Field of the Invention

The invention herein relates to tote bags and more particularly to a tote bag that is adapted to secure to the handle of a cart or similar object.

2. Overview of Prior Art

A problem that has plagued all of us at one time or another is going to a market and being tasked with the juggling act of hanging onto your wallet, keys and coupons. This is only compounded if you have small children that accompany the shopper. Not only does the task of keeping track of the children increase shopping stress experience but small children commonly sit in the child's seat where many of these items are temporarily stored by the shopper. In an attempt to assist the shopper many shopping bags have been developed, but all fall short of the critical shortfalls presented.

One such attempt is disclosed by Posner in U.S. Pat. No. 4,871,100. Here a foldable shopping bag that fits in a shopping cart is shown. Items are placed directly into the bag which is located in the cart. Since the items have to be removed from the cart to be checked and then bagged anyway, the practical function of the invention is limited at best. No disclosure is made to store the shopper's personal items, only the purchased items. To do so is clearly not anticipated and as disclosed does not address the problem as stated.

A similar theme is disclosed in U.S. Pat. No. 5,531,366 to Strom. Instead of a foldable bag, a collapsible caddie is disclosed that can be folded into a backpack. The function is similar to Posner in that the apparatus fits in the cart and is supported by the upper rim of the basket. Another shortcoming of the disclosed is that the individual compartments minimize the functional capacity of the cart. One of the compartment could be used to store personal effects but the device does not allow for a child to sit in the child's seat while the device is in use. Also the physical size of the carts vary from manufacturer to manufacturer. This device does not appear to anticipate this variance in carts which contributes to the limited function of the device.

A shopping bag that can be secured to a shopping cart is disclosed by Geeck in U.S. Pat. No. 5,009,516. This is a collapsible bag comprising a large storage bag and a smaller second bag. The combination also has a snap to secure the user's vehicle keys and can be fastened to the inside of a shopping cart. As before, the device is intended to primarily hold purchased items, not personal effects the shopper brings into the store. The device as disclosed, does not present an easily accessible storage for those items to the shopper or a child sitting in the child's seat.

A shopping bag and tote therefore was disclosed by Caligiuri in U.S. Pat. No. 5,297,872. The disclosure is of a reusable shopping bag, again for purchased items, and a tote bag for storage of the bag when it is not in use. It does not disclose nor anticipate storage of personal items nor any attachment to a shopping cart. In light of this the disclosure does not address the shortcomings as expressed herein.

In terms of storage items for the children, Sonders, in U.S. Pat. No. 5,326,300 disclosed a carrying device that is in the form of a child's toy. The toy, such as a teddy bear, includes an internal pocket, suitable for storage of children's items such as a bottle and diapers. The device is clearly not intended to be adapted to a shopping cart nor to the function of serving the shopper and/or a child passenger with storage and transport of personal effects. In that sense it also does not satisfy the need as disclosed.

Another child's transport bag was disclosed by Smallwood in U.S. Pat. No. 4,874,340. Here, as previously disclosed, the intended function of the device is to transport items suitable for a child. Toys, books and the like can be stored inside with a toy animal outside to make the device pleasing to young children. The device also includes a pair of straps to enable the device to be used as a backpack. The shortcomings here include that of the device disclosed by Sonders. The device is not intended to be adapted to a shopping cart nor to the function of serving the shopper and/or a child passenger.

A product from Right Start called the Shopping Cart Friend is also disclosed. This consists of a single flap that attaches to the handle of the cart and is suitable only for that specific child in that toys include rings and such that the child would put into his or her mouth. It would not be desirable to have another child contact this after another just handled it. This necessitates the device be removable and go with the shopper, not allowing a product to stay on the cart permanently. There are also no pockets provided to store items for the child and more importantly the item is intended for use only for the child, there is not another side for use by the shopper.

A utility bag was disclosed by L,each in U.S. Pat. No. 5,103,514 where the device is comprised of a flexible, rectangular fabric tube with a resilient, flexible material inside. The tube can be folded into a U-shape for transport and carried with the straps which extend outwardly from the sides of the tube. The device is clearly not intended to be associated with a shopping cart nor to the easy, simultaneous accessibility of shopper's personal affects and children's items and as such does not address the disclosed shortcomings in the art.

Other foldable or collapsible travel pouches are disclosed by Robitille and Franco in U.S. Pat. Nos. 5,244,278 and 4,991,245 respectively. Both disclose a foldable outer case with compartments located therein. Neither shows an anticipated use in conjunction with a shopping cart nor duel simultaneous use for the shopper and a child in the child's seat of the cart.

A duel cupped coupon holder is disclosed by Anatra in U.S. Pat. No. 5,048,736 with the intended use on a shopping cart handle. The limitations of such a device are far reaching in that the molded one piece container is intended to support only coupons or other light objects. This disclosure does not take into account a child in the seat of the cart. A colorful grouping of individual pieces of paper would greatly attract a small child's attention. The disclosure does not provide for security for valuables such as money or other personal items from a child in the seat nor from a thief posing as a shopper.

A bicycle brief case is disclosed by Tiffany in U.S. Pat. No. 5,031,807 in which a saddle bag construction of a briefcase is fastened to the frame of a bicycle. This would be less than adequate for use on a shopping cart because of the intended function of the fasteners being at the bottom of the flaps and as before the pockets open at the top of the device. This allows access to anyone who can get their hand into the opening of the bag, even a child in the seat of the cart.

SUMMARY OF THE INVENTION

The object of the disclosed invention is to provide a means of securing personal items that are typically used by a shopper in a store or market and making them easily accessible to the user. A second purpose is to provide a means of carrying children's items and making same accessible to the child as the child is sitting in the child's seat of a shopping cart. The device is comprised of one or more flaps, some of which include pockets for holding items. The invention is optimally used with two main flaps, one on each side of a pliable section that is capable of wrapping over and securing to the handle bar of a shopping cart. This puts one flap in easy reach of the shopper and the adjacent on the lap of a child in the child's seat. The pockets on the shopper's side would include pockets suitable for storing coupons, a wallet, car keys, a cellular phone, a shopping list and any other items that a shopper might need. The flap could also include a clear window with a solar powered calculator secured therein or even a bar code scanner or a tapeless voice recorder to further assist the shopper. Some or all of these pockets can be restricted from accessibility to a young child use of one or more cover flaps that lay over the openings of the pockets.

The adjacent flap would include pockets for child's toys, books and other items to keep a child occupied while riding in the child's seat. The shopping experience can seem laborious for young children and as such a pillow can be included and tethered to the child's side of the invention. This allows the child to comfortably lay his or her head down on the handle bar located just above their lap.

DETAILED DESCRIPTION OF THE PREFERRED EMBODIMENT

Every shopper that has found it necessary to bring a small child along has encountered the frustration of doing more than one task at the same time. In today's busy society where many times both parents work or in single parent families this scenario happens more times than not. In order to keep track of the child the shopping carts have a child's seat directly in front of the hand rail. This enables the shopper to keep the child close at hand while enduring the shopping experience, but two problems rear their ugly heads. First, where do you keep your personal items such as a check book, wallet, coupons, car keys, sunglasses, a pen and the list goes on. More "hi-tech" shoppers might include a cellular phone and a calculator. The second challenge is how do you keep a young child occupied for up to an hour or more in the supermarket? Well, you could give your $500 cellular phone and your car keys to your baby to play with, but in terms of fiscal responsibility to the household not to mention safety of the child, this is not an equitable solution.

Figure 1:
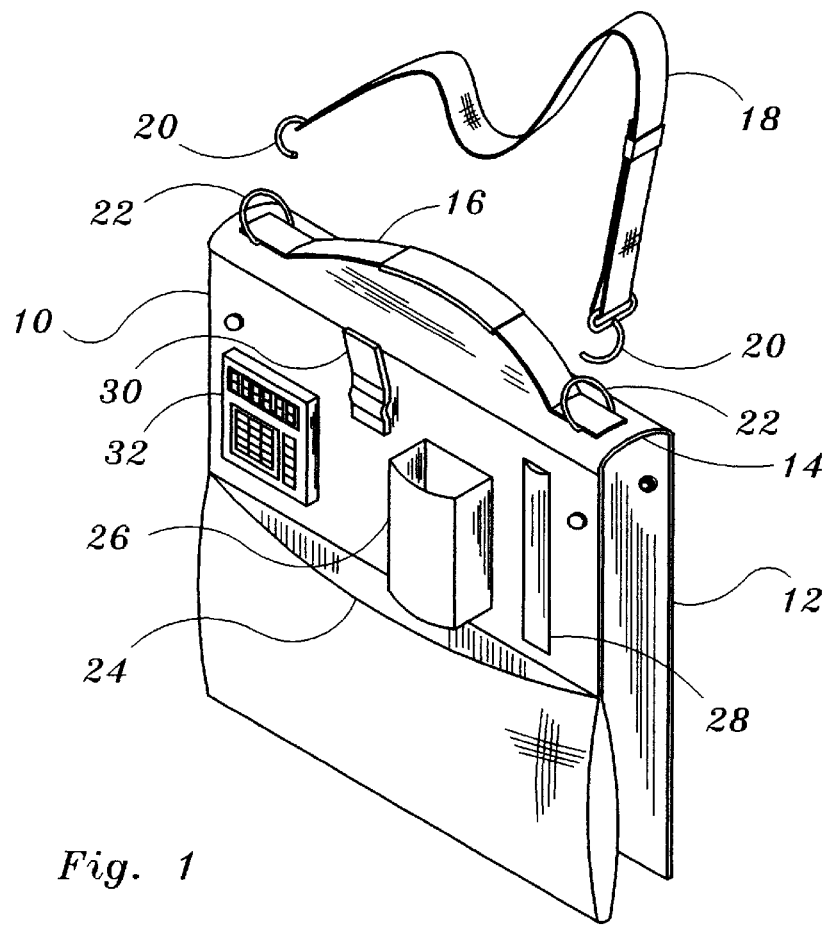
FIG. 1 is an isometric view showing the shopper's side of a shopping tote bag produced in accordance with a preferred embodiment of the present invention.

A much more practical solution is disclosed and shown in the drawings included herein. In FIG. 1 one such version of the preferred embodiment of a shopping tote bag is shown. Here a first flap 10 is shown and a second flap 12 is positioned adjacent thereto. The flaps are connected by a flap connector 14 upon which a handle 16 is secured. The handle is not a necessary part of the invention but it is deemed desirable if the invention is brought into the store by the shopper and taken along when they leave. To further facilitate the transfer from car to shopping cart and back to car, a shoulder harness 18 is disclosed to allow the user to keep their hands free as an alternative to or in addition to the handle 16. Here the shoulder harness 18 is shown to be adjustable in length to make it more suitable for a wide variety of individual body sizes. The harness 18 includes a pair of hooks 20 that are capable of being received by the adjacent rings 22 to releasably secure one to the other. It may be desirable to have the shoulder harness removable because in use on a shopping cart this length of material could be accessible and potentially dangerous to a small child. The large pocket 24 can be used to store the harness 18 when not in use and is then out of reach of the child, as will be more apparent as the embodiment is further disclosed. Though it is desirable for the harness 18 to be removable it is not necessary to the function of the invention and could be fixably attached or not exist at all. If used, the method of attachment to the flap connector 14 is greatly variable and not specific to the invention.

The first flap 10 also includes a series of pockets that are not in and of themselves necessary to the function of the invention. What is shown here, and in the subsequent figures, is a sample of the variety of pockets and attachments desirable to the utility of the invention. An infinite number of variations is possible and this disclosure is not intended to be inclusive of all the possibilities associated therewith. A sample of the pockets and attachments includes a phone pocket 26 for the storage of a cellular phone or sunglasses and a pen pocket 28 to hold a pen or pencil for later use by the user. Mechanical additions include a coupon clip 30 that is preferably made from a spring material to hold coupons or a shopping list, both of which would be in plain sight to the user. A calculator 32 is also shown and is preferred to be enclosed in a pocket of a clear, flexible plastic cover. This enables the user to use the calculator 32 without removing it from the bag. This is especially desirable if the invention is permanently fixed to the shopping cart handle.

The invention is shown here with a rigid second flap 12 and a flexible first flap 10. This is another example of the versatility in the uses of the invention. Here the second flap 12, which is positioned for the child in the seat of the shopping cart, would be capable of including a writing utensil and semi rigid surface to write on, to help entertain the child. Pockets may also be included on this side to store personal items brought from home for the child including but not limited to a baby bottle, books and toys.

Figure 2:
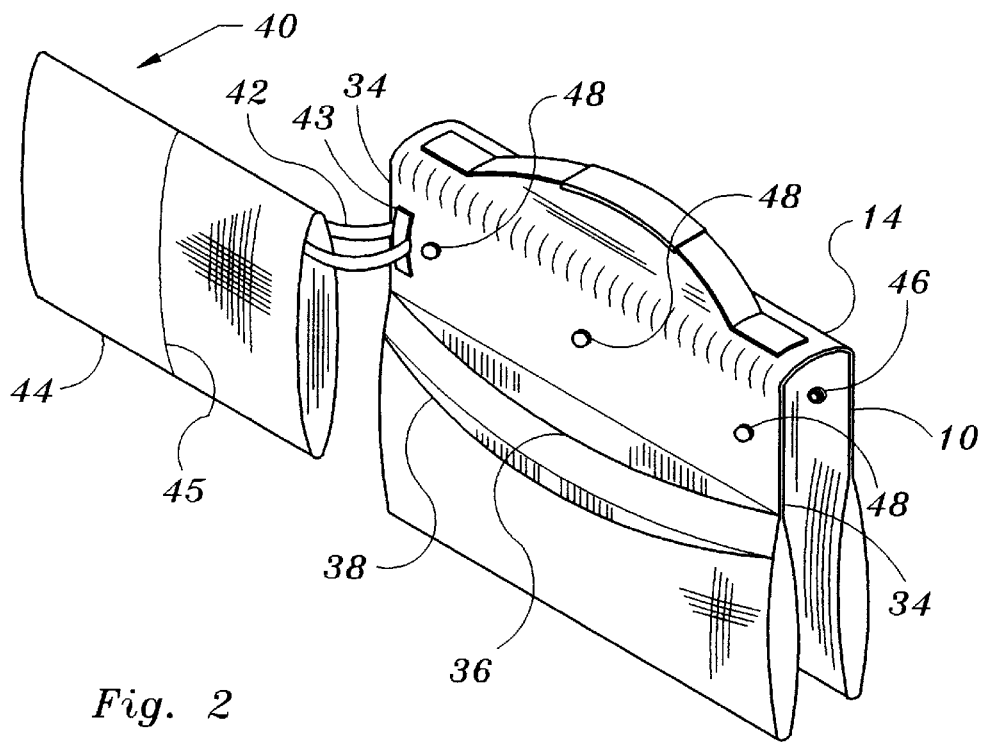
FIG. 2 is an isometric view showing the child's side of a shopping tote bag produced in accordance with a preferred embodiment of the present invention.

FIG. 2 shows another example of the invention, showing a soft version of the second flap 34. The second flap 34 is disposed directly in the child's lap when the child is in the seat of the shopping cart. Here a first pocket 36 and a smaller second pocket 38 are shown to provide a storage means for children's toys, snacks, even potentially an extra diaper, wipes and a small blanket. As stated before these are only examples of the uses. The user is only limited by the size of the pockets and the user's imagination.

As a specialty, FIG. 2 also shows a pillow 40 attached to a tether 42. The tether 42 is secured to the second flap 34 by a loop 43 attached thereto. The tether 42 and pillow 40 combination allow removal of the pillow 40 from a position of storage in the first pocket 36 or second pocket 38, to let the youngster lay his or her head down in comfort and hopefully avoid those "I'm so tired I could scream" blues while the user is perusing the detergent aisle of the supermarket. The pillow 40 can be traditional or as shown here to be assembled into the case 44 through the center slot 45. This enables the cushion of the pillow to be traditional or a foldable item such as a blanket or towel.

A series of fasteners is also shown on the adjacent flaps. Here they are shown as pairs of mating snaps. The first snap 46 is secured to the first flap 10 and it's mating second snap 48 is shown secured to the second flap 34. Three pairs of such snaps are shown here but the number is not relevant. The first snaps 46 fasten to the second snaps 48 with the handle bar of the shopping cart captured between them and the flap connector 14. This arrangement allows for the removable securing of the invention to the cart for use and removal when the shopping experience is over.

Figure 3:
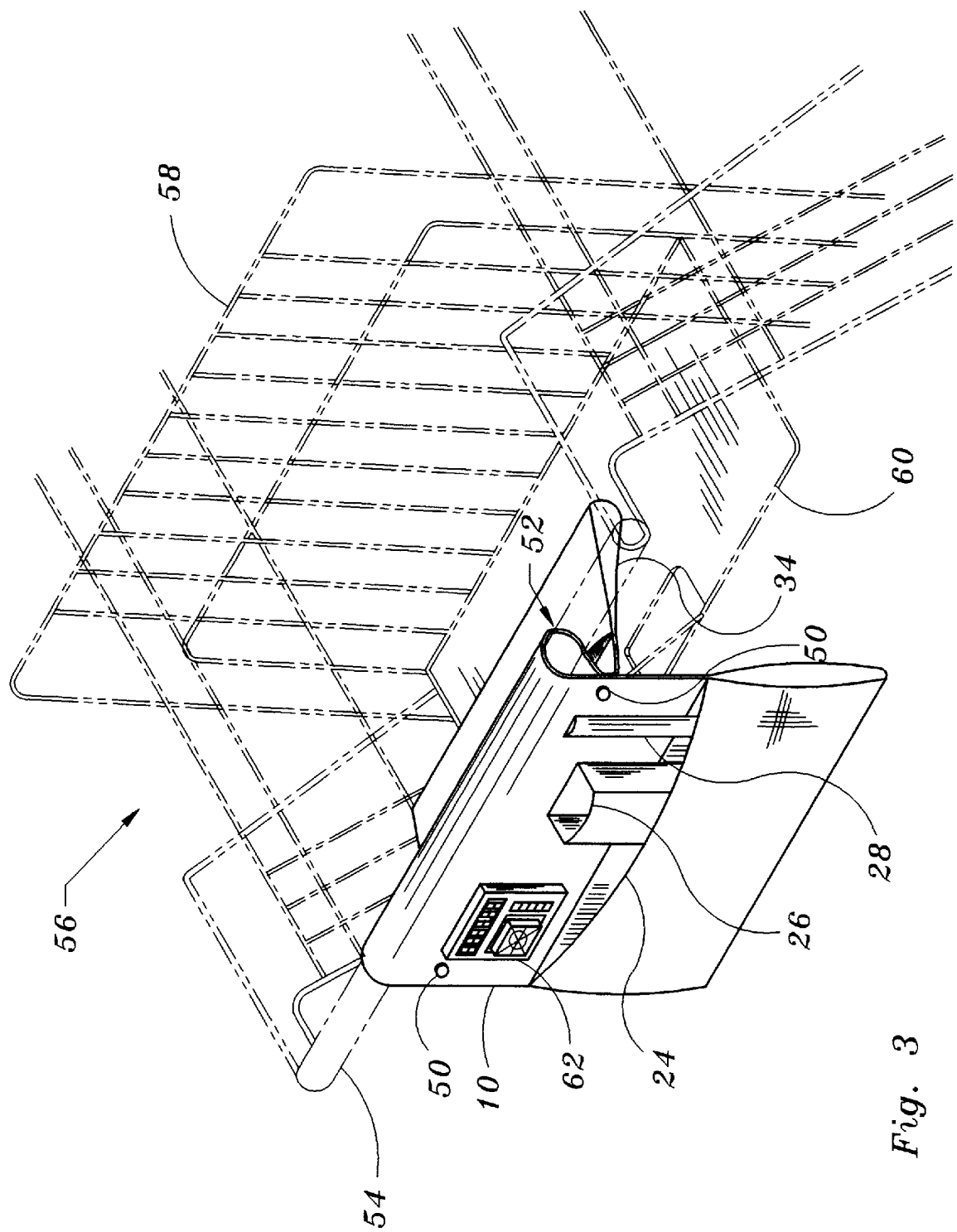
FIG. 3 is an isometric view showing the shopper's side of a shopping tote bag as it would be typically attached to the handle of a shopping cart, the bag produced in accordance with a preferred embodiment of the present invention.

The typical use of the invention is shown in FIG. 3. Here the bag includes a first flap 10 and a second flap 34 similar to the previously disclosed. The first flap 10 and the second flap 34 are here shown to be continuous with one another and fixably attached to one another by a pair of rivets 50. The pocket 52 created thereby captures the handle 54 of a shopping cart 56, thereby securing the invention to the cart 56 in a semi-permanent arrangement. The handle of previous figures has been removed in that the invention will not be removed from the cart 56. Here the proximity of the invention to the child's seat as defined by the seat back 58 and seat bottom 60 where the child would sit, facing the invention, the second flap 34 easily being placed in the child's lap.

The first flap 10 is shown here to include similar pockets and devices as before including the large pocket 24, phone pocket 26 and pen pocket 28. The calculator has now been replaced with a bar code scanner 62. This would enable the shopper to know pricing and even keep a running total of purchases before reaching the checkout counter. The calculator and bar code scanner would be battery and/or solar powered and the semi-permanent manner of fixing the invention to the cart 56 would enable low cost versions of either of these devices to be included. Where the invention is intended to be a permanent part of the cart 56, the material is more important to consider than with the removable versions. There cotton, polyester or nylon would more than likely be the materials of choice, but when the invention must be subjected to the elements of the weather, thermoplastics or synthetic or natural rubber may be more desirable. The invention assumes a large variety of materials to function properly and is not limited to those mentioned herein.

When very small children are taken into the store they are commonly placed in their infant car seat and then placed in the child's seat of the cart 56. To maintain accessibility to the child in this case the invention can be fastened to the car seat itself or as before to the handle 54 of the cart 56.

Figure 4:
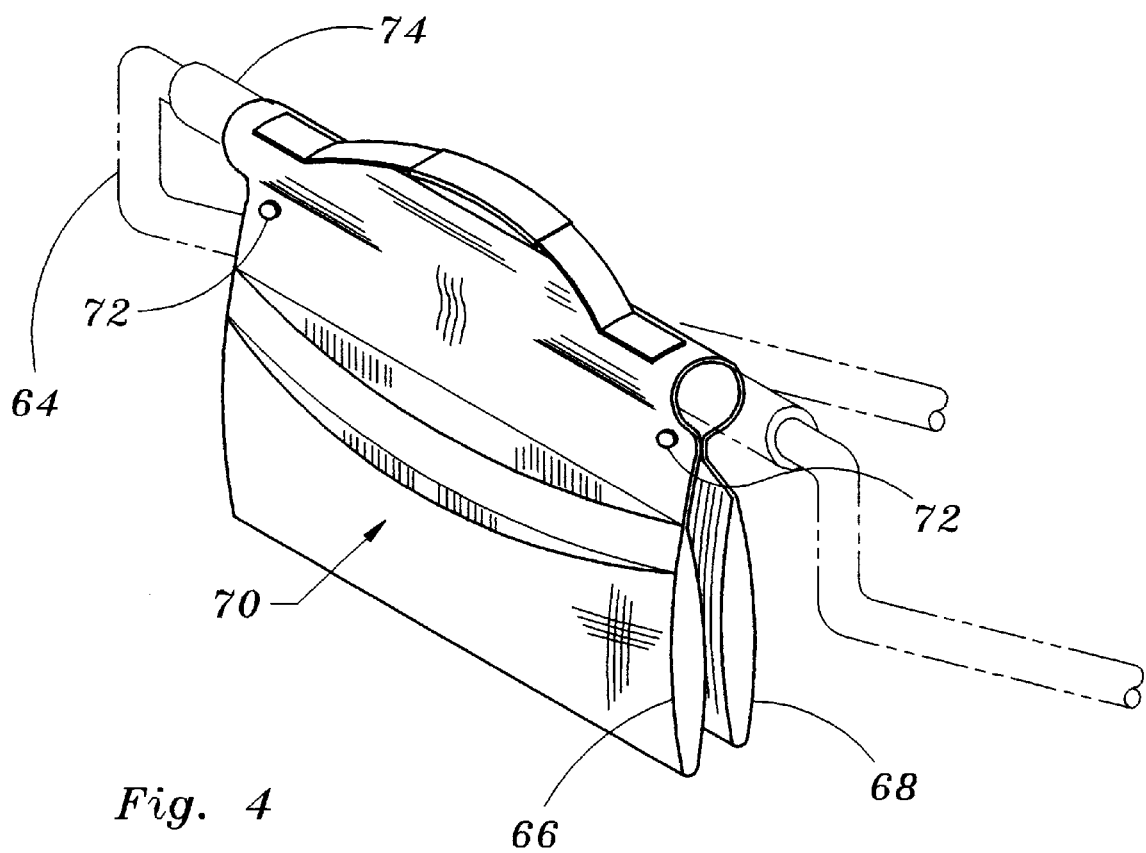
FIG. 4 is an isometric view showing the shopper's side of a shopping tote bag as it would be typically attached to the handle of a baby stroller, the bag produced in accordance with a preferred embodiment of the present invention.

Another typical use is with a baby stroller. FIG. 4 shows a handled version of the invention secured around a baby stroller handle 64 or even a lawn mower. Here another version is shown with first flap 66 and a second flap 68 each including pockets 70 for holding items. The flaps are secured together by a pair of mating snaps 72, capturing the hand grip 74 of the handle 64 as shown. A more permanent fastener such as rivets or threaded fasteners could also be used here. Many strollers allow the child to face either way in the seat, which would allow similar interaction between the child and the invention and the placement of the invention is consistent with the shopping cart with regard to the user, therefore the utility is also consistent. The variety of carry-on's could change to include radio headphones and a garage door opener, when going for a stroll around the neighborhood, and possibly stopping in the store down the street for a carton of milk.

Figure 5:
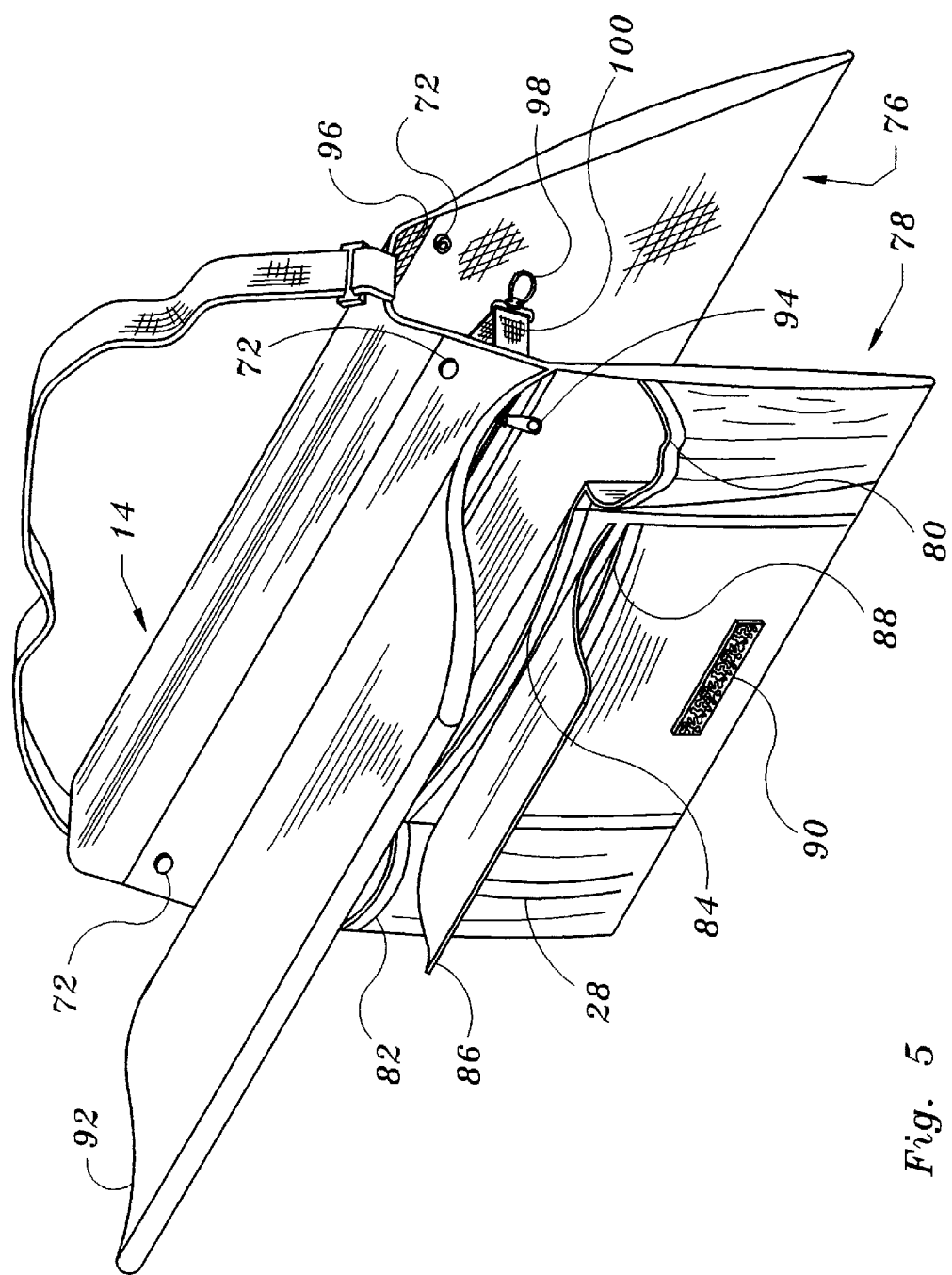
FIG. 5 is an isometric view showing the shopper's view of a shopping tote bag with a cover flap and a hidden pocket located therein, the bag produced in accordance with the preferred embodiment of the present invention.

The preferred embodiment of the invention is shown in FIG. 5. The second flap 76 is shown here to be similar to that as previously disclosed. The first flap 78 is also similar in function to the previously disclosed in the use of a series of pockets on the outside of the flap 78. The special feature of this disclosure is in a set of pocket cover flaps which restrict access to the contents of the pockets. The pockets on the first flap 78 as shown in this figure, are still disclosed, as in the previous figures, to be low so as to restrict accessibility to a small child sitting in the cart seat but with the addition of the cover flaps this feature is less important. The pockets include a bottle pocket 80 which can be used to hold a baby bottle, juice box or also used to store a cell phone. A glasses pocket 82 is located on the first flap and opposite to the bottle pocket 80.

The glasses pocket 82 will optimally include a soft inner surface, such as felt or another soft cotton material to prevent scratching the lenses of the eyeglasses or sun glasses that are stored therein. The glasses pocket 82 is also shown here to include a small vertical pocket or pin pocket 28 on the outside. This is used as disclosed previously.

Though the relative positioning of the pockets is not critical to the function of the invention it is beneficial if the parent uses the glasses pocket 82 for his/her glasses (something not to be accessible by the child in the seat) and the bottle pocket 80 for a baby bottle. As the child gets older and is able to reach over the flap connector 14 the child will easily identify the large bottle, remembering it as being on one specific side such as the child's left, as is shown here.

The coupon pocket 84 completes the open pocket sequence for this example. This pocket can be used for anything that the user would typically find necessary to be easily accessible, such as coupons during shopping. Just below the opening of the coupon pocket 84 is a small cover flap 86. This small cover flap 86 covers the opening to the secure pocket 88. The small cover flap 86 extends from the outer surface of the the coupon pocket 84 and may include a fastening means to secure it in a closed position. Here a hook and loop strip 90 is shown on the outside of the secure pocket and a mating strip is located on the inside of the small cover flap 86 (not shown). Valuable items such as a wallet or check book could be stored in this pocket, the small cover flap 86 making the pocket 88 less visible and accessible to a child in the seat and also to a potential thief.

In the same theme as the small cover flap 86 a large cover flap 92 is shown to cover all of the pockets on the first flap 78. This may or may not include a fastening means to secure the large cover flap 92 to the first flap 78. The simple act of covering the pockets removes them from the sight of any child sitting in the seat, thus making the child's second flap 76 and its contents located therein appealing to the child because of the immediate proximity. The large cover flap 92 on the parent's side, or the first flap 78 is a deterrent to the child from disturbing the contents. Especially small children would not be physically capable of reaching far enough down to grab the outer edge of the large flap to pull it up and gain access to the pockets on the first flap 78.

The positioning of the pockets on the first flap 78 is critical if a device is constructed in the absence of the cover flaps. In this case the pockets on the first flap 78 are intentionally shown to be located with the pocket openings away from the flap connector 14, thus away from the top edge of the first flap 78. In the case of small children, typically infants, they would not be able to reach the pocket openings on the first flap 78, and thereby disturb the parent's items. As the child matures and would be able to reach over the handle, he or she will be able to understand the parent's instructions to leave the items on the parent's side alone. The cover flaps facilitate this with older children as well as in purposes such as deterring potential thieves, but the function of the invention could be realized without the cover flaps.

To further utilize available storage, a hidden pocket can be located within any or all of the cover flaps or even the first and or second flaps, thus creating security pockets. Here a zipper 94 is shown to provide the opening for a hidden pocket in the large cover flap 92. Not only is this pocket secure due to its hidden accessibility, but items stored in this pocket add weight to the pocket making it more difficult for little wandering hands to get into the patent's pockets on the first flap 78.

The bag would mount as stated before, typically with fasteners to secure the first flap 78 to the second flap 76 around a handle such as would be found on a shopping cart. Here the snaps 72 show how this would be done. Security is another use of the snaps. It would be difficult for a shop lifter to "grab and run" because he would first have to unsnap it from the cart handle. An unattended purse on the other hand is an easy target for a thief.

The portion of the bag above the snaps, or the flap connector 14 which connects the first flap 78 to the second flap 76 is shown here to include a high friction mesh 96 that is sewn into the underside of the flap connector 14. This creates a high friction cushion between the user's hand and the handle, via the flap connector 14. This also creates a slightly cushioned surface for a baby to place his/her head, or even as commonly happens during the teething years, the infant's mouth. It is a protective barrier from the germ ridden handle and the bag can be washed at the parent's discretion. The high friction material of the friction mesh 96 can be comprised of a variety of substances and as such is not critical to the function of the invention. The inventors have found a nylon mesh that is coated with a systhetic rubber such as polyurethane, neoprene, or silicone; natural rubber or other latex based products such as a foam rubber; or even some theremoplastics such as polypropolene to be some of the more desireable materials in a variety of products that have proven to function adequately.

Another useful addition to the invention is a key hook 98 or clasp, which is shown here to be fastened to the first flap 78 by a strap 100. The key hook 98 can exist in a variety of ways including an "S" hook or a strap with a fastener on the distal end which fastens to some part of the first flap 78. The most effective means is shown here to be a spring clip that swivels. This allows the user to clip their keys about the key ring and have the keys secure and visible at all times. This eliminates inadvertently dropping them in the store or searching through pockets, especially while balancing a child and the groceries. This type of key hook 98 has another valuable purpose in that it is to difficult for a small child to try to remove them from the hook 98, thus eliminating the child from getting them out of a pocket and trying to ingest them.

What is claimed is:

1. A duel access tote bag comprising:

a first flap and a second flap, each flap defining a first surface and a second surface;

a flap connector adjoining said first flap to said second flap such that when the first flap and the second flap are oriented on a plane surface with the flap connector therebetween, the first surface of said first flap will be coplanar with the first surface of said second flap;

at least one pocket with an opening on the first surface of said first flap and at least one pocket with an opening on the first surface of said second flap, the opening on said first flap being disposed away from said flap connector;

a grip cushion attached to said flap connector such that the grip cushion will contact a handle of a device when the tote bag is positioned thereon; and a fastening means located adjacent to said flap connector, capable of securing said first flap to said second flap, whereby with the flap connector positioned on the handle of the device with the first flap on one side of the handle and the second flap on the other side of the handle, the fastening means causes the tote bag to capture the handle, securing it thereto; the tote bag enables storage of items in the at least one pocket on said first flap that is inhibitively accessible other than to a user adjacent to said first flap.

2. The tote bag as described in claim 1, wherein said grip cushion is comprised of a material selected from the group consisting of a mesh coated with a synthetic rubber including polyurethane, neoprene, and silicone; natural rubber and other latex based products such as a foam rubber; and thermoplastics.

3. The tote bag as described in claim 1, further including at least one pocket with an opening on the second surface of any flap, whereby the opening of the pocket would not be visible to passers by, thus enhancing security of items stored therein.

4. The tote bag as described in claim 1, further comprising a glasses pocket with at least a portion of the inside of the pocket being lined with a scratch resistant material, whereby the material inhibits damaging a pair of eyeglasses upon insertion and removal of the eyeglasses from the pocket.

5. A duel access tote bag comprising:

a first flap and a second flap, each flap defining a first surface and a second surface;

a flap connector adjoining said first flap to said second flap such that when the first flap and the second flap are oriented on a plane surface with the flap connector therebetween, the first surface of said first flap will be coplanar with the first surface of said second flap;

at least one pocket with an opening on the first surface of said first flap and at least one pocket with an opening on the first surface of said second flap, the opening on said first flap being disposed away from said flap connector;

at least one cover flap with one edge attached to said first flap, the cover flap being of sufficient size to cover the opening of said at least one pocket of said first flap;

a grip cushion attached to said flap connector such that the grip cushion will contact a handle of a device when the tote bag is positioned thereon; and a fastening means located adjacent to said flap connector, capable of securing said first flap to said second flap, whereby with the flap connector positioned on the handle of the device with the first flap on one side of the handle and the second flap on the other side of the handle, the fastening means causes the tote bag to capture the handle, securing it thereto; the tote bag enables storage of items in the at least one pocket on said first flap that is inhibitively accessible other than to a user adjacent to said first flap.

6. The tote bag as described in claim 5, wherein said grip cushion is comprised of a material selected from the group consisting of a mesh coated with a synthetic rubber including polyurethane, neoprene, and silicone; natural rubber and other latex based products such as a foam rubber; and thermoplastics.

7. The tote bag as described in claim 5, further including at least one pocket with an opening on the second surface of any flap, whereby the opening of the pocket would not be visible to passers by, thus enhancing security of items stored therein.

8. The tote bag as described in claim 5, further comprising a glasses pocket with at least a portion of the inside of the pocket being lined with a scratch resistant material, whereby the material inhibits damaging a pair of eyeglasses upon insertion and removal of the eyeglasses from the pocket.

* * * * *